United States Patent [19]

Vaeth et al.

[11] 4,058,506

[45] Nov. 15, 1977

[54] THERMOPLASTIC, ELASTIC POLYURETHANES WHICH ARE SOLUBLE IN ETHERS AND/OR KETONES

[75] Inventors: Guenter Vaeth, Limburgerhof; Rudolf Bachmann, Frankenthal; Heinrich Hartmann; Herbert Spoor, both of Limburgerhof; August Lehner, Roedersheim-Gronau, all of Germany

[73] Assignee: BASF Aktiengesellschaft, Ludwigshafen, Germany

[21] Appl. No.: 607,099

[22] Filed: Aug. 25, 1975

[30] Foreign Application Priority Data

Sept. 6, 1974 Germany .............................. 2442763

[51] Int. Cl.² ...................... C08G 18/44; C08G 18/48; C08G 18/76
[52] U.S. Cl. ........................ 260/75 NP; 260/77.5 AN; 260/77.5 AM
[58] Field of Search ................. 260/75 NP, 77.5 AM, 260/77.5 AN

[56] References Cited

U.S. PATENT DOCUMENTS

| | | | |
|---|---|---|---|
| 2,753,319 | 7/1956 | Brockway | 260/75 NP X |
| 3,425,973 | 2/1969 | Shaw | 260/75 NP |
| 3,705,132 | 12/1972 | Cuscurida | 260/75 NP |
| 3,761,439 | 9/1973 | Ward et al. | 260/77.5 AN X |
| 3,823,060 | 7/1974 | McChung et al. | 260/75 NP X |
| 3,850,880 | 11/1974 | Hakanson | 260/77.5 AM X |
| 3,929,730 | 12/1975 | Graefe et al. | 260/77.5 AM X |

*Primary Examiner*—Sandra M. Person
*Attorney, Agent, or Firm*—Keil, Thompson & Shurtleff

[57] ABSTRACT

Thermoplastic, elastic polyurethanes which are soluble in ethers and/or ketones and have a high surface hardness and high modulus of elasticity are manufactured from a polyester-ol and/or a polyether-ol, a substituted or unsubstituted diisocyanato-diphenylmethane or diisocyanato-diphenylsulfone, an aliphatic, branched-chain diol of the formula $HOCH_2-CR^1R^2-CO_2OH$, in which $R^1$ is alkyl and $R^2$ is alkyl or hydrogen, and, optionally, a triol.

9 Claims, No Drawings

THERMOPLASTIC, ELASTIC POLYURETHANES WHICH ARE SOLUBLE IN ETHERS AND/OR KETONES

The present invention relates to new thermoplastic, elastic polyurethanes which are soluble in ethers and/or ketones and have a high surface hardness and high modulus of elasticity, and to their manufacture.

The manufacture of soluble thermoplastic polyurethanes has been disclosed. According to German Pat. No. 1,106,958, polyesterurethanes which are virtually free from crosslinking are manufactured from polyester-ols which are obtained by condensation of phthalic acid with a branched-chain aliphatic diol of 5 to 10 carbon atoms and having the following arrangement of 5 carbon atoms and one of the two OH groups

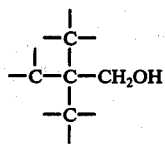

an aliphatic glycol and an aromatic diisocyanate, the starting materials being used in such amounts as to provide from 1.1 to 4 moles of diisocyanate and from 0.1 to 3 moles of glycol per mole of the polyester-ol.

German Pat. No. 1,106,959 discloses the manufacture of soluble polyester-urethanes by reaction of 1 mole of a polyester-ol, from 0.1 to 2.1 moles of glycol and from 1.1 to 3.1 moles of diphenylmethane-diisocyanate. The polyester-ols used are polycondensates with molecular weights of from 600 to 1,200 and the glycols used are preferably straight-chain diols of the formula $HO-(CH_2)_n-OH$, wherein $n$ is a whole number from 4 to 8.

German Pat. No. 1,112,291 relates to the manufacture of rubbery thermoplastic polyurethanes by reaction of polyalkylene glycol ethers possessing terminal hydroxyl groups, aliphatic $\omega,\omega'$-glycols and a diisocyanate possessing two phenyl radicals.

Elastic thermoplastic polyester-urethanes are also obtained according to German printed application No. 1,301,124, when a mixture of 1 mole of a polyester with terminal hydroxyl groups, from 2 to 4 moles of one or more diols, optionally at most 0.5 mole of a triol and from 3 to 5.75 moles of an aliphatic diisocyanate are reacted by conventional methods at above 100° C in a chlorinated, aromatic solvent which boils at from 120° to 200° C and is inert towards isocyanate groups.

It is a disadvantage of the elastic, thermoplastic polyurethanes manufactured by the above processes that for many applications their surface hardness is too low (the pendulum hardness, measured according to DIN 53,157, being less than 70 seconds), their modulus of elasticity is too low (less than 300 N/mm²) or their solubility in ethers and/or ketones is inadequate.

It is an object of the present invention to provide thermoplastic, elastic polyurethanes which are readily soluble in ethers and/or ketones and have a high surface hardness and a high modulus of elasticity, without the tensile strength and extensibility being impaired thereby.

We have found that polyurethanes having these advantageous properties are obtained from polyester-ols and/or polyether-ols, aromatic diisocyanates, aliphatic branched-chain diols and, optionally, triols if the following are reacted by conventional methods, if appropriate in the presence of catalysts, solvents, assistants and additives:

A. 1 mole of one or more linear polyester-ols and/or polyether-ols of molecular weight from 600 to 4,000, B. from 4 to 16 moles of a branched-chain diol of the formula

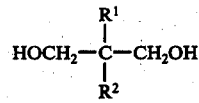

in which $R^1$ is alkyl of 1 to 4 carbon atoms and $R^2$ is hydrogen or alkyl of 1 to 4 carbon atoms and optionally C. from 0.001 to 1 mole of an aliphatic triol, with D. from 5 to 18.5 moles of an aromatic diisocyanate of the formula

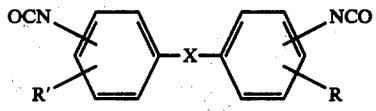

in which X is methylene or a $SO_2$ group and R and R' are hydrogen, chlorine and/or methyl, the ratio of the number of hydroxyl groups employed to the number of isocyanate groups being from about 1:0.98 to 1:1.08.

We have found, surprisingly, that such polyurethanes not only have a high surface hardness and a high modulus of elasticity without adverse effect on tensile strength and extensibility, but are also very readily soluble in ethers and ketones, especially in cyclic ethers and ketones, such as tetrahydrofuran, dioxan and cylcohexanone. A further advantage of the process of the invention is that the starting materials for the manufacture of the polyurethanes are not restricted to specific polyester-ols or polyether-ols, eg. those based on phthalic acids and branched-chain diols according to German Pat. No. 1,106,958 or polyalkylene glycol ethers of the formula $HO[(CH_2)_nO]_xH$, in which $n$ is from 3 to 6 and $x$ is greater than 7, as in German Pat. No. 1,112,291, but that instead all linear polyester-ols and/or polyether-ols falling within the stated molecular weight range can be used. Thus, eg., polyester-ols, such as adipates based on glycols, polycaprolactones or aliphatic polycarbonates, as well as polyether-ols based on alkylene oxides and tetrahydrofuran, can be used for the manufacture of the polyurethanes.

As has already been explained, the polyols used for the manufactures of the termoplastic, elastic polyurethanes which are virtually free from branching, are soluble in ethers and/or ketones and have a high surface hardness and a high modulus of elasticity are polester-ols and/or polyether-ols.

Suitable polyester-ols are essentially linear and have molecular weights of from 600 to 4,000, preferably from 800 to 3,000, and acid numbers less than 10, preferably less than 3, and in particular less than 1. The polyesters can be manufactured in a simple manner by esterification of aliphatic dicarboxylic acids of 4 to 12 carbon atoms, preferably of 4 to 6 carbon atoms, with aliphatic glycols, which optionally contain ether groups, of 2 to 20 carbon atoms, preferably of 4 to 6 carbon atoms, or by polymerization of cyclic lactones of 3 to 6 carbon atoms using conventional starters, such as water and glycols.

Examples of suitable aliphatic dicarboxylic acids are glutaric acid, pimelic acid, suberic acid, sebacic acid, dodecanedioic acid and, preferably, adipic acid and succinic acid. The dicarboxylic acids can be used individually or as mixtures. To manufacture the polyester-ols it may at times be advantageous to use, in place of the dicarboxylic acids, the corresponding acid derivatives, such as carboxylic acid esters of 1 to 4 carbon atoms in the alcohol radical, carboxylic acid anhydrides or carboxylic acid chlorides. Examples of glycols are ethylene glycol, 1,3-propanediol, diethylene glycol, pentanediol, decanediol and 2,2,4-trimethyl-1,5-pentanediol. 1,4-Butanediol, 1,6-hexanediol and 2,2-dimethyl-1,3-propanediol are preferred. Examples of cyclic lactones are α,α-dimethyl-β-propiolactone, butyrolactone and, preferably, caprolactone. Depending on the desired properties of the polyester-oils, the polyols may be used as separate compounds or as mixture in various ratios. At times it may also be expedient to use polyester-ol mixtures be manufacture polyurethanes having particular properties.

The polyether-ols are essentially linear compounds which possess terminal hydroxyl groups, containing ether bonds and having a molecular weight of from about 800 to 4,000, preferably from 1,000 to 2,000. Suitable polyether-ols may be manufactured by polymerization of cyclic ethers, such as tetrahydrofuran, or by reaction of one or more alkylene oxides of 2 to 4 carbon atoms in the alkylene radical, with a starter molecule which contains two active hydrogen atoms. Examples of alkylene oxides are ethylene oxide, 1,2-propylene oxide, epichlorohydrin, 1,2-butylene oxide and 2,3-butylene oxide. The alkylene oxides may be used individually, alternately or as mixtures. Examples of starter molecules are water, glycols, eg. ethylene glycol, propylene glycol, 1,4-butanediol and 1,6-hexanediol, amines, eg. ethylenediamine, hexamethylenediamine and 4,4'-diaminodiphenylmethane, and aminoalcohols, eg. ethanolamine. Linke the polyester-ols, the polyether-ols may be used as separate compounds or as mixtures.

It is an essential feature of the present invention that branched-chain aliphatic diols of the formula

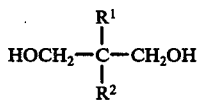

in which $R^1$ is alkyl of 1 to 4 carbon atoms, preferably of one carbon atom, and $R^2$ is hydrogen or alkyl of 1 to 4 carbon atoms, preferably of one carbon atom, are used as chain extenders. Examples are 2-methyl-1,3-propanediol, 2-methyl-2-ethyl-1,3-propanediol, 2-methyl-2-isopropyl-1,3-propanediol, 2,2-diethyl-1,3-propanediol, 2-methyl-2butyl-1,3-propanediol and 2-ethyl-2-butyl-1,3-propanediol. The preferred branched-chain aliphatic diol is 2,2-dimethyl-1,3-propanediol, also known by the trivial name of neopently glycol. By using such branched-chain aliphatic diols as chain extenders, numerous hard segments may be introduced into the polyurethane molecule without significantly reducing the solubility of the products. The branched-chain diols may be used as individual compounds or as mixtures.

In the manufacture of the polyurethanes, in accordance with the invention, the above branched-chain diols may optionally be replaced in part, eg. to the extent of 50 mole%, and preferably of up to 30 mole%, by an equimolar amount of a glycol of the formula HO—$(CH_2)_n$—OH, wherein $n$ is one of the integers 2 to 8, or the hydroxyl groups of the branched-chain diol may be replaced, eg. to the extent of up to 15 mole%, preferably up to 5 mole%, by those of the corresponding amount of an aliphatic triol.

The hardness of the product can be modified within certain limits by the use of linear diols or triols. Thus, eg., partial replacement of 2,2-dimethyl-1,3-propanediol by a glycol, eg. ethylene glycol, 1,4-butanediol or 1,6-hexanediol, gives softer polyurethanes, whilst partial replacement of branched-chain diols by triols, eg. trimethylolethane, hexanetriol and, preferably, trimethylolpropane or glycerol, permits a further increase in surface hardness as a result of crosslinking.

The aromatic diisocyanates used, which react with the polyester-oils and/or polyether-ols, the branched-chain diols and, if present, the triols, correspond to the formula

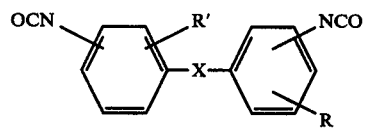

in which X is methylene or a $SO_2$ group and R and R' are hydrogen, chlorine or methyl and may be identical or different. Examples of aromatic diisocyanates of the above type are dichloro-diphenylmethane-diisocyanates, dimetyl-diphenylmethane-diisocyanates, 4,4'-, 4,2'- and 2,2'-diisocyanato-diphenylmethane and the corresponding isomer mixtures and diisocyanato-diphenylsulfones. Excellent products are obtained with 4,4'-diisocyanato-diphenylmethane and therefore this aromatic diisocyanate is preferred.

Though the ratio of the reactants is a deciding factor in the manufacture of the polyurethanes of the invention, it can be varied from about 5 to 18.5 moles of diisocyanate per mole of polyester-ol and/or polyether-ol, if from about 4 to 16 moles of branched-chain diol and, optionally, one mole of triol, are used, the amount of diol used depending in part on the molecular weight of the polyester-ol and/or polyether-ol employed. If a triol is used, its amount is at most one mole per mole of polyester-ol and/or polyether-ol. This ratio depends in particular on the content of branched-chain diol, and up to 15%, preferably up to 5%, of the hydroxyl groups of the branched-chain diols may be replaced by hydroxyl groups of aliphatic triols. Particularly good products are obtained when the ratio of the equivalent of weights of branched-chain diol to triol is from about 7:1 to 50:1.

In addition to the above ratios, the amount of diisocyanate used also depends on the amount of polyester-ol and/or polyether-ol, branched-chain diol and, where present, aliphatic triol. The amount of diisocyanate should essentially be chemically equivalent to the amounts of compounds containing hydroxyl groups, so that at the end of the reaction practically no free unconverted isocyanate, and no free unconverted hydroxyl groups, remain. However, for practical reasons it can be desirable to use the diisocyanate in an excess of up to 8%, preferably of up to 6%, over the amount required for complete conversion of the reactants, so that the ratio of the number of hydroxyl groups employed to the number of isocyanate groups in the reaction mixture is from about 1:0.98 to 1:1.08, preferably from about 1:1.02 to 1:106.

To manufacture polyurethanes of the above type which have particularly advantageous properties, preferably from 5 to 13.75 moles of aromatic diisocyanate, from 4 to 12 moles of branched-chain diol and optionally from 0.1 to 0.5 mole of triol are used per mole of polyester-ol and/or polyether-ol.

The new thermoplastic, elastic polyurethanes which are soluble in ethers and/or ketones may be manufactured in the absence of solvents. Preferably, however, the products are manufactured in solution by the one-shot process or prepolymer process, if appropriate in the presence of catalysts and other assistants and/or additives, eg. dibutyl-tin dilaurate or triethylenediamine.

Preferred solvents are cyclic ethers, eg. tetrahydrofuran and dioxan, and cyclic ketones, eg. cyclohexanone. Of course, the polyurethanes may also be dissolved in other strongly polar solvents, eg. dimethylformamide, pyrrolidone, dimethylsulfoxide or ethylene glycol acetate. The solvents mentioned can equally be mixed with aromatics, eg. toluene or xylene, and esters, eg. ethyl acetate or butyl acetate.

Examples of catalysts for the manufacture of the polyurethanes are tert. amines, eg. triethylamine, triethylenediamine, N-methyl-pyridine, N-methyl-piperidine and N-methyl-morpholine, metal salts, such as potassium acetate and zinc stearate, and organic metal compounds, eg. dibutyl-tin dilaurate. The appropriate amount of catalyst depends on the activity of the catalyst in question. In general it has provided appropriate to use from 0.005 to 0.3 part by weight, preferably from 0.01 to 0.1 part by weight, per 100 parts by weight of aromatic diisocyanate.

Details of the method of manufacture of the new thermoplastic and elastic polyurethanes which are soluble in ethers and/or ketones are as follows:

In the one-shot process, the starting materials are dissolved in a part of the solvent, so as to form solutions of from 30 to 50% by weight solids content. The solutions are then heated at from 20° to 90° C. preferably from 30° to 70° C, while stirring. In the course of the reaction the polyurethane solutions, which become more viscous, are diluted in stages up to a specific final concentration and are converted, at this concentration, until a specific final viscosity is reached. The polyaddition reaction is stopped by addition of monoalcohols, eg. methanol, ethanol, sec.-propanol, sec-butanol, or secondary amines, eg. dimethylamine, ethylpropylamine, dibutylamine and the like. In the prepolymer process, the polyisocyanate, the polyester-ol and/or the polyether-ol and, where these are present, the catalyst and the assistants and additives, are reacted in some of the solvent at from 20° to 90° C, preferably from 30° to 70° C, to give prepolymers containing isocyanate groups. After a reaction time of from about 0.5 to 2 hours, the branched-chain diol and, if it is used, the triol are added to the reaction mixture in the course of from 0.5 to 3 hours. Thereafter the reaction proceeds as described for the one-shot process. The polyurethane solutions thus obtained have solids content of from 50 to 5% by weight, preferably from 30 to 10% by weight, and the viscosities of 20% strength by weight solutions are from 500 to 15,000 cp at 20° C.

The polyurethane solutions may be used as such. However, it is also possible to remove the solvent, eg. by distillation, if appropriate under reduced pressure, or by spray drying, in which case the product is obtained directly as a powder. The polyurethane may also be precipitated by adding a non-solvent.

The thermoplastic and elastic polyurethanes manufactured according to the invention are very readily soluble in ethers and/or ketones, especially in cyclic ethers and ketones, have melting points above 100° C, preferably at from 120° to 220° C, and have a surface hardness of from 70 to 160 seconds (measured according to DIN 53,157), moduli of elasticity of from 300 to 2,000 N/mm$^2$ (according to DIN 53,457), elongations at break (according to DIN 53,455) of >250%, especially of >400%, and tensile strengths (according to DIN 53,455) of >55 N/mm$^2$, especially of >65 N/mm$^2$.

The products may be used for coating, eg., textiles, paper and plastics, for the manufacture of coverings, for impregnation and as surface-coating binders. Preferably, however, the products are used as dressings for leather and leather-like materials.

In the examples, the parts are by weight.

EXAMPLE 1

A solution of 250 parts of tetrahydrofuran, 100 parts (0.05 mole) of an ethylene glycol adipate of molecular weight 2,000 and 131.2 parts (0.525 mole) of 4,4'-diisocyanatodiphenylmethane is stirred with 0.02 parts of dibutyl-tin dilaurate for one hour at 50° C. A mixture of 167 parts of tetrahydrofuran, 45.8 parts (0.44 mole) of neopentyl glycol, 0.9 part (0.0067 mole) of trimethylolpropane and 0.05 part of dibutyl-tin dilaurate is then added in the course of one hour to the prepolymer solution which contains isocyanate groups, at 55° C, whilst stirring. On reaching a viscosity of 2,000 to 3,000 cp at 55° C, the polyurethane solution is diluted in stages to a solids content of about 20% by weight with 232 parts, 185 parts and 278 parts of an 0.01% strength by weight dibutyl-tin dilaurate solution in tetrahydrofuran. After the reaction mixture, of about 20% strength by weight, has again reached a viscosity of from 1,500 to 2,000 cp at 55° C, the reaction is stopped by adding 1.8 parts of dibutylamine and the reaction solution is cooled. The polyurethane obtained has a viscosity of 3,500 cp as a 20% strength by weight solution in tetrahydrofuran, a Konig pendulum hardness of 125 seconds and a modulus of elasticity of 1,380 N/mm$^2$.

EXAMPLES 2 TO 5

Thermoplastic, elastic and soluble polyurethanes are manufactured analogously to example 1 from polytetrahydrofuran of molecular weight 2,000, ethylene glycol adipate of molecular weight 2,000 and diethylene glycol adipate of molecular weight 2,800. The compositions of the starting materials and the properties of the product are summarized in table 1.

COMPARATIVE EXAMPLE A

On proceeding analogously to example 1, but using 1,4-butanediol as the chain extender in place of neopentyl glycol, a product which is insoluble in tetrahydrofuran is obtained.

TABLE 1

Composition of the starting materials, ratios used and properties of the products of examples 1 to 5 and of Comparative example A

| Example | 1 | 2 | 3 | 4 | 5 | Comparative example A |
|---|---|---|---|---|---|---|
| Polyester-ol from adipic acid and ethylene glycol (molecular weight 2,000) (moles) | 0.05 | — | 0.0375 | — | 0.05 | 0.05 |
| Polytetrahydrofuran (molecular weight 2,000) (moles) | — | 0.05 | 0.0125 | — | — | — |
| Polyester-ol from adipic acid and diethylene glycol (molecular weight 2,800) (moles) | — | — | — | 0.05 | — | — |
| Neopentyl glycol (moles) | 0.44 | 0.44 | 0.44 | 0.45 | 0.34 | — |
| 1,4-Butanediol (moles) | — | — | — | — | 0.1 | 0.44 |
| Trimethylolpropane (moles) | 0.0067 | 0.0067 | 0.0067 | — | 0.0067 | 0.0067 |
| 4,4'-Diisocyanato-diphenylmethane (moles) | 0.525 | 0.525 | 0.525 | 0.525 | 0.525 | 0.525 |
| Viscosity of a 20% strength by weight solution of the polyurethane in tetrahydrofuran at 20° C (cP) | 3,500 | 2,800 | 4,200 | 4,900 | 3,200 | |
| König pendulum hardness (sec) | 125 | 106 | 124 | 88 | 80 | |
| Modulus of elasticity (N/mm$^2$) | 1,380 | 850 | 1,320 | 1,100 | 550 | |
| Notes | clear solutions in tetrahydrofuran | | | | | insoluble in tetrahydrofuran, two layers form |

EXAMPLES 6 TO 10 AND COMPARATIVE EXAMPLES B TO M

Further thermoplastic, elastic polyurethanes are manufactured analogously to example 1, by varying the starting materials.

The Comparative Examples were carried out without addition of neopentyl glycol as a chain extender.

The composition of the starting materials, the ratios used and the properties of the products are summarized in table 2.

The examples show that thermoplastic, elastic polyurethanes which are soluble in tetrahydrofuran are obtained by the use of neopentyl glycol as a chain extender.

TABLE 2

Survey of the starting materials, the ratios and properties of the products of examples 6-10 and of Comparative Examples B-M

| Examples / Comparative examples | 6 | B | 7 | C | D | 8 | E | F |
|---|---|---|---|---|---|---|---|---|
| Polycaprolactone (molecular weight 830) (moles) | 0.1 | 0.1 | 0.1 | 0.1 | 0.1 | — | — | — |
| 1,4-butanediol adipate (molecular weight 940) (moles) | — | — | — | — | — | 0.1 | 0.1 | 0.1 |
| Ethylene glycol adipate (molecular weight 2,000) (moles) | — | — | — | — | — | — | — | — |
| Polytetrahydrofuran (molecular weight 2,000) (moles) | — | — | — | — | — | — | — | — |
| Neopentyl glycol (moles) | 0.385 | — | 0.4 | — | — | 0.385 | — | — |
| 1,4-Butanediol (moles) | — | 0.385 | — | 0.4 | — | — | 0.4 | — |
| Ethylene glycol (moles) | — | — | — | — | 0.4 | — | — | 0.4 |
| 1,6-Hexandiol (moles) | — | — | — | — | — | — | — | — |
| Trimethylolpropane (moles) | 0.01 | 0.01 | — | — | — | — | — | — |
| 4,4'-Diisocyanato-diphenylmethane (moles) | 0.52 | 0.52 | 0.52 | 0.52 | 0.52 | 0.52 | 0.52 | 0.52 |
| Tetrahydrofuran (parts) | 1,016 | 816 | 1,020 | 1,020 | 1,020 | 1,080 | 1,080 | 1,080 |
| Dimethylformamide (parts) | — | 200 | — | — | — | — | — | — |
| Dibutylamine (parts) | 0.95 | 0.95 | 0.4 | 0.4 | 0.4 | 0.45 | 0.45 | 0.45 |

| Examples / Comparative examples | 9 | G | H | J | 10 | K | L | M |
|---|---|---|---|---|---|---|---|---|
| Polycaprolactone (molecular weight 830) (moles) | — | — | — | — | — | — | — | — |
| 1,4-butanediol adipate (molecular weight 940) (moles) | — | — | — | — | — | — | — | — |
| Ethylene glycol adipate (molecular weight 2,000) (moles) | 0.1 | 0.1 | 0.1 | 0.1 | — | — | — | — |
| Polytetrahydrofuran (molecular weight 2,000) (moles) | — | — | — | — | 0.1 | 0.1 | 0.1 | 0.1 |
| Neopentyl glycol (moles) | 0.385 | — | — | — | 0.385 | — | — | — |
| 1,4-Butanediol (moles) | — | 0.385 | — | — | — | 0.385 | — | — |
| Ethylene glycol (moles) | — | — | 0.385 | — | — | — | 0.385 | — |
| 1,6-Hexandiol (moles) | — | — | — | 0.385 | — | — | — | 0.385 |
| Trimethylolpropane (moles) | 0.01 | 0.01 | 0.01 | 0.01 | 0.01 | 0.01 | 0.01 | 0.01 |
| 4,4'-Diisocyanato-diphenylmethane (moles) | 0.515 | 0.515 | 0.515 | 0.515 | 0.515 | 0.515 | 0.515 | 0.515 |
| Tetrahydrofuran (parts) | 1,450 | 1,450 | 1,450 | 1,450 | 1,450 | 1,450 | 1,450 | 1,450 |
| Dimethylformamide (parts) | — | — | | | | | | |

TABLE 2-continued

Survey of the starting materials, the ratios and properties of the products of examples 6-10 and of Comparative Examples B-M

| | | | | | | | | |
|---|---|---|---|---|---|---|---|---|
| Dibutylamine (parts) | 0.45 | 0.45 | 0.45 | 0.45 | 0.45 | 0.45 | 0.45 | 0.45 |
| Examples | 6 | | 7 | | | 8 | | |
| Comparative examples | | B | | C | D | | E | F |
| Viscosity of 20% strength by weight solutions of the polyurethanes in tetrahydrofuran at 20° C (cP) | 4,400 | — | 2,800 | — | — | 3,500 | — | — |
| Konig pendulum hardness (in sec) | 116 | 59 | — | — | — | — | — | — |
| Modulus of elasticity (kp/cm²) | 13,00 | 2,100 | — | — | — | — | — | — |
| Solubility in tetrahydrofuran | soluble | insoluble | soluble | insoluble | | soluble | | insoluble |
| Notes | Clear solution | Product soluble in mixtures of tetrahydrofuran and dimethylformamide | | | 2 layers, turbid | Clear solution | | 2 layers, turbid |
| Examples | 9 | | | | 10 | | | |
| Comparative examples | | G | H | J | | K | L | M |
| Viscosity of 20% strength by weight solutions of the polyurethanes in tetrahydrofuran at 20° C (cP) | 2,900 | — | — | — | 2,800 | — | — | — |
| Konig pendulum hardness (in sec) | — | — | — | — | — | — | — | — |
| Modulus of elasticity (kp/cm²) | — | — | — | — | — | — | — | — |
| Solubility in tetrahydrofuran | soluble | insoluble | | | soluble | insoluble | | |
| Notes | Clear solution | 2 layers | | | Clear solution | 2 layers | | |

We claim:

1. Thermoplastic, elastic polyurethanes which are soluble in ethers and/or ketones and have a high surface hardness and high modulus of elasticity, which are obtained by reaction of
   A. one mole of a lineaar polyester-ol and/or polyether-ol of molecular weight from 600 to 4,000,
   B. from 4 to 16 moles of a branched-chain diol of the formula

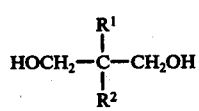

in which R¹ is alkyl of 1 to 4 carbon atoms and R² is hydrogen or alkyl of 1 to 4 carbon atoms and optionally
   C. from 0.001 to 1 mole of an aliphatic triol, with
   D. from 5 to 18.5 moles of an aromatic diisocyanate of the formula

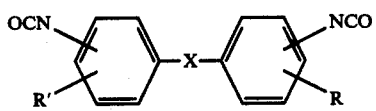

in which X is methylene or a SO₂ group and R and R' are hydrogen, chlorine and/or methyl, the ratio of the number of hydroxyl groups employed to the number of isocyanate groups being from about 1:0.98 to 1:1.08.

2. A process for the manufacture of thermoplastic and elastic polyurethanes which are soluble in ethers and/or ketones and have a high surface hardness and high modulus of elasticity, from a polyester-ol and/or polyether-ol, an aromatic diiscyanate, an aliphatic branched-chain diol and, optionally, a triol, which comprises: reacting
   A. 1 mole of one or more linear polyester-ols and/or polyether-ols and molecular weight from 600 to 4,000,
   B. from 4 to 16 moles of a branched-chain diol of the formula

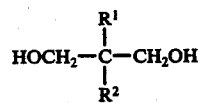

in which R¹ is alkyl of 1 to 4 carbon atoms and R² is hydrogen or alkyl of 1 to 4 carbon atoms and optionally
   C. from 0.001 to 1 mole of an aliphatic triol, with
   D. from 5 to 18.5 moles of an aromatic diisocyanate of the formula

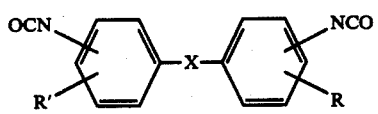

in which X is methylene or a SO₂ group and R and R' are hydrogen, chlorine and/or methyl, the ratio of the number of hydroxyl groups employed to the number of isocyanate groups being from about 1:1 to 1:108.

3. A process for the manufacture of thermoplastic and elastic polyurethanes which are soluble in ethers and/or ketones and have a high surface hardness and high modulus of elasticity, as claimed in claim 2, wherein the branched diol used is 2-methyl-1,3-propanediol, 2-methyl-2-ethyl-1,3-propanediol, 2-methyl-2-isopropyl-1,3-propanediol, 2,2-diethyl-1,3-propanediol, 2-methyl-2-butyl-1,3-propanediol or 2-ethyl-2-butyl-1,3-propanediol.

4. A process as claimed in claim 2, wherein 2,2-dimethyl-1,3-propanediol is employed as the branched-chain diol.

5. A process as claimed in claim 2, wherein 4,4'-, 4,2'- and 2,2'-diisocyanato-diphenylmethane or corresponding isomer mixtures are employed as the aromatic diisocyanate.

6. A process as claimed in claim 5, wherein 4,4'-diisocyanatodiphenylmethane is employed as the aromatic diiscyanate.

7. A process as claimed in claim 2, wherein 2,2-dimethyl-1,3-propanediol is employed as the branched-chain diol and 4,4'-diisocyanato-diphenylmethane is employed as the aromatic diisocyanate.

8. A process as claimed in claim 2, wherein the following are reacted by conventional methods:
   A. 1 mole of at least one linear polyester-ol and/or polyether-ol of molecular weight from 600 to 4,000,
   B. from 4 to 12 moles of a branched-chain diol of the formula $HOCH_2CR'$—$R^2$—$CH_2OH$, in which $R'$ and $R^2$ have the above meaning, and optionally
   C. from 0.1 to 0.5 mole of an aliphatic triol, with
   D. from 4.5 to 13.75 moles of 2,2'-, 4,4'- and/or 4,2'-diisocyanato-diphenylmethane or corresponding isomer mixtures,
   the ratio of the sum of the hydroxyl groups to the number of isocyanate groups being from 1:0.98 to 1:1.06.

9. Thermoplastic, elastic polyurethanes as set forth in claim 1, wherein said branched diol is 2-methyl-1,3-propanediol, 2-methyl-2-ethyl-1,3-propanediol, 2-methyl-2-isopropyl-1,3-propanediol, 2,2-diethyl-1,3-propanediol, 2-methyl-2-butyl-1,3-propanediol or 2-ethyl-2-butyl-1,3-propanediol.

* * * * *

UNITED STATES PATENT AND TRADEMARK OFFICE
CERTIFICATE OF CORRECTION

PATENT NO. : 4,058,506
DATED : November 15, 1977
INVENTOR(S) : VAETH ET AL

It is certified that error appears in the above-identified patent and that said Letters Patent are hereby corrected as shown below:

Claim 1, column 9, line 39, delete "lineaar" and substitute --linear--.

Claim 2, column 10, line 37, delete "diiscyanate" and substitute --diisocyanate--; line 66, delete "1:108." and substitute --1:1.08.--.

Claim 5, column 11, line 13, delete "dis-" and substitute --dii- --.

Claim 6, column 11, line 18, delete "diiscyanate" and substitute --diisocyanate--.

Signed and Sealed this

Twenty-fourth Day of April 1979

[SEAL]

Attest:

RUTH C. MASON
Attesting Officer

DONALD W. BANNER
Commissioner of Patents and Trademarks